United States Patent
Chinta (10) Patent No.: US 8,707,457 B2
(45) Date of Patent: Apr. 22, 2014

(54) METHODS AND SYSTEMS FOR FORCING AN APPLICATION TO STORE DATA IN A SECURE STORAGE LOCATION

(75) Inventor: Madhav Chinta, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 279 days.

(21) Appl. No.: 13/098,727

(22) Filed: May 2, 2011

(65) Prior Publication Data

US 2011/0277013 A1 Nov. 10, 2011

Related U.S. Application Data

(60) Provisional application No. 61/332,797, filed on May 9, 2010.

(51) Int. Cl.
*H04L 29/06* (2006.01)

(52) U.S. Cl.
USPC .................. 726/29; 726/26; 726/27; 726/28; 726/30

(58) Field of Classification Search
USPC ..................................... 726/29, 26, 27, 28, 30
See application file for complete search history.

(56) References Cited

U.S. PATENT DOCUMENTS

| | | | |
|---|---|---|---|
| 6,587,949 B1 | 7/2003 | Steinberg | |
| 8,290,763 B1 * | 10/2012 | Zhang | 703/26 |
| 2002/0023225 A1 * | 2/2002 | Lomnes | 713/200 |
| 2002/0133711 A1 * | 9/2002 | Peretti | 713/193 |
| 2003/0177178 A1 * | 9/2003 | Jones et al. | 709/203 |
| 2003/0191716 A1 * | 10/2003 | Woods et al. | 705/50 |
| 2004/0006706 A1 | 1/2004 | Erlingsson | |
| 2004/0103280 A1 * | 5/2004 | Balfanz et al. | 713/169 |
| 2005/0278544 A1 * | 12/2005 | Baxter | 713/182 |
| 2006/0156036 A1 | 7/2006 | Oh et al. | |
| 2007/0283432 A1 * | 12/2007 | Peretti | 726/21 |
| 2009/0187982 A1 * | 7/2009 | Balfanz et al. | 726/9 |
| 2009/0187991 A1 | 7/2009 | Freericks et al. | |
| 2010/0125730 A1 * | 5/2010 | Dodgson et al. | 713/153 |
| 2010/0150341 A1 * | 6/2010 | Dodgson et al. | 380/29 |
| 2011/0141124 A1 * | 6/2011 | Halls et al. | 345/522 |
| 2011/0145418 A1 * | 6/2011 | Pratt et al. | 709/227 |
| 2011/0145458 A1 * | 6/2011 | Narasimhan | 710/260 |
| 2011/0145819 A1 * | 6/2011 | McKenzie et al. | 718/1 |
| 2011/0145820 A1 * | 6/2011 | Pratt et al. | 718/1 |

(Continued)

OTHER PUBLICATIONS

International Preliminary Report on Patentability on PCT/US2011/034814 dated Nov. 22, 2012.

(Continued)

*Primary Examiner* — Bradley Holder
(74) *Attorney, Agent, or Firm* — Foley & Lardner LLP; John D. Lanza (57) ABSTRACT

The present application is directed to methods and systems for redirecting write requests issued by trusted applications to a secure storage. Upon redirecting the write requests, the data included in those requests can be stored in the secure storage area of a client computer. In some embodiments, the methods and systems can include determining whether an application issuing the request is a trusted application that requires data to be stored in a secure storage repository. Upon making this determination, a filter driver can identify a secure storage area on a client computer and can redirect the write request to this secure storage. In other embodiments, the filter driver may deny requests of trusted applications to write to unsecure storage areas.

18 Claims, 6 Drawing Sheets

(56) References Cited

U.S. PATENT DOCUMENTS

| | | | |
|---|---|---|---|
| 2011/0145821 A1* | 6/2011 | Philipson et al. | 718/1 |
| 2011/0145886 A1* | 6/2011 | McKenzie et al. | 726/1 |
| 2011/0145916 A1* | 6/2011 | McKenzie et al. | 726/19 |
| 2011/0265183 A1* | 10/2011 | Wu et al. | 726/24 |

OTHER PUBLICATIONS

International Search Report on PCT/US2011/034814 dated Dec. 27, 2011.

Written Opinion on PCT/US2011/034814 dated Dec. 27, 2011.

* cited by examiner

METHODS AND SYSTEMS FOR FORCING AN APPLICATION TO STORE DATA IN A SECURE STORAGE LOCATION

RELATED APPLICATIONS

This present application claims priority to and the benefit of U.S. Provisional Patent Application No. 61/332,797, entitled "Methods and Systems for Forcing an Application to Store Data in a Secure Storage Location," filed May 9, 2010, which is hereby incorporated by reference in its entirety.

FIELD OF THE INVENTION

The methods and systems described herein relate generally to enforcing corporate security policies. In particular, the methods and systems relate to creating a trusted storage repository on an end device, and protecting the confidentiality of application information and user data by storing the information in a trusted storage repository.

BACKGROUND OF THE INVENTION

Permitting associates to bring their personal laptop or computer to work and use that laptop as their company computer has become popular with many corporations. In many instances, these programs allow an employee to use their personal computer in lieu of a company machine. While the program has many advantages, one of the large disadvantages of having an employee use their personal computer for work-related computing, is that employees often store sensitive company documents and application information to their generally unsecure personal computer. Disk space on a personal laptop is typically unmanaged and it is difficult to enforce security policies when a user is not logged into a company network. Thus, systems and methods are needed to protect the confidentiality of corporate information on the user's computing device and enforce policies to protect the same.

SUMMARY OF THE INVENTION

Described are embodiments of methods and systems for forcing an application to store application and user data in a secure storage area by redirecting write requests issued by trusted applications to a secure storage. Upon redirecting the write requests, the data included in those requests can be stored in the secure storage area of a client computer. In some embodiments, the methods and systems can include determining whether an application issuing the request is a trusted application that requires data to be stored in a secure storage repository. Upon making this determination, a filter driver can identify a secure storage area on a client computer and can redirect the write request to this secure storage, without any modifications needing to be performed to the application. Accordingly, transparently redirecting the write requests to a secure storage forces a user to store application and user data in a secure storage area thereby enforcing security policies that require particular applications to be stored in a secure storage area.

In one aspect, the present application is directed to a method for forcing an application to store data in a secure storage location. The method includes identifying, by a policy engine executed by the first computing device, a first application executed by the first computing device as a trusted application. The method also includes intercepting, by a file system filter driver, a first request of the first application to write a first set of data to an unsecure storage location. The method further includes redirecting, by the file system filter driver, responsive to the identification of the first application as a trusted application, the intercepted first request to a secure storage location. The method also includes writing, by the first computing device, the first set of data to the secure storage location.

In some embodiments, the method includes intercepting, by the file system filter driver, a second request of the first application to read a file from the unsecure storage location, and providing, by the file system filter driver, responsive to the identification of the first application as a trusted application, read-only access to the file to the first application. In another embodiment, the method includes encrypting the first set of data in the secure storage location.

In one embodiment, the method includes intercepting, by the file system filter driver, a second request of the first application to write a second set of data to the unsecure storage location. The method also includes determining, by the policy engine, responsive to the identification of the first application as a trusted application, that a first application delivery client executed by the first computing device has not communicated with a centralized management service executed by a second computing device within a predetermined time period. The method further includes denying, by the file system filter driver, responsive to the determination, the second request to write the second set of data to the unsecure storage location.

In another embodiment, the method includes identifying, by the policy engine, a second application executed by the first computing device as a non-trusted application. The method also includes intercepting, by the file system filter driver, a third request of the second application to write a third set of data to the unsecure storage location. The method further directing, by the file system filter driver, responsive to the identification of the second application as a non-trusted application, the first computing device to write the third set of data to the unsecure storage location.

In some embodiments, the first application is a client agent displaying graphical output data of a second application executed by a second computing device, communicated to the first computing device via a remote desktop protocol. In other embodiments, the method includes applying a policy to user credentials of the user of the first application. In still other embodiments, the method includes receiving, from a second computing device, a list of predetermined applications identified as trusted by an administrator. In yet still other embodiments, the first application is streamed from a second computing device, and the method includes determining that the first application is a streamed application.

In one embodiment, the method includes intercepting, by the file system filter driver, a fourth request of a second application to read the first set of data from the secure storage location. The method also includes identifying, by the policy engine, the second application as a non-trusted application. The method further includes denying, by the file system filter driver, responsive to the identification of the second application as a non-trusted application, the fourth request to read the first set of data from the secure storage location.

In another aspect, the present application is directed to a system for forcing an application to store data in a secure storage location. The system includes a first computing device comprising an unsecure storage location, a secure storage location, and a processor configured to execute a first application, a policy engine, and a file system filter driver. The policy engine is configured to identify the first application as a trusted application. The file system filter driver is configured for intercepting a first request of the first application to write a first set of data to the unsecure storage location; redirecting, responsive to the identification of the first application as a trusted application, the intercepted first request to a secure storage location; and writing the first set of data to the secure storage location.

In one embodiment of the system, the file system filter driver is configured for intercepting a second request of the first application to read a file from the unsecure storage location; and providing, responsive to the identification of the first application as a trusted application, read-only access to the file to the first application. In another embodiment, writing the first set of data to the secure storage location further comprises encrypting the first set of data in the secure storage location.

In some embodiments of the system, the first computing device is further configured to execute a first application delivery client. The policy engine is further configured to determine, responsive to the identification of the first application as a trusted application, that a first application delivery client executed by the first computing device has not communicated with a second application delivery client executed by a second computing device within a predetermined time period. The file system filter driver is further configured to intercept a second request of the first application to write a second set of data to the unsecure storage location, and deny, responsive to the determination, the second request to write the second set of data to the unsecure storage location.

In other embodiments of the system, the first computing device is further configured to execute a second application. The policy engine is further configured to identify the second application as a non-trusted application. The file system filter driver is further configured to intercept a third request of the second application to write a third set of data to the unsecure storage location, and write the third set of data to the unsecure storage location. In a further embodiment, the file system filter driver is further configured to direct, responsive to the identification of the second application as a non-trusted application, the first computing device to write the third set of data to the unsecure storage location.

In some embodiments of the system, the first application is a client agent displaying graphical output data of a second application executed by a second computing device, communicated to the first computing device via a remote desktop protocol. In other embodiments of the system, identifying a first application as a trusted application comprises applying a policy to user credentials of the user of the first application. In yet still other embodiments of the system, the policy engine receives, from a second computing device, a list of predetermined applications identified as trusted by an administrator In one embodiment, the first application is streamed from a second computing device, and identifying the first application as a trusted application comprises determining that the first application is a streamed application. In another embodiment, the processor of the first computing device is further configured to execute a second application. The policy engine is further configured to identify the second application as a non-trusted application. The file system filter driver is further configured to intercept a fourth request of the second application to read the first set of data from the secure storage location, and deny, responsive to the identification of the second application as a non-trusted application, the fourth request to read the first set of data from the secure storage location. In still other embodiments, the file system filter driver is configured to intercept a request of the first application to write to the unsecure storage location, and deny the request. Denying the request may comprise presenting, to a user of the first computing device, an alert message indicating access to the unsecure storage location is denied.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Figure 1A:
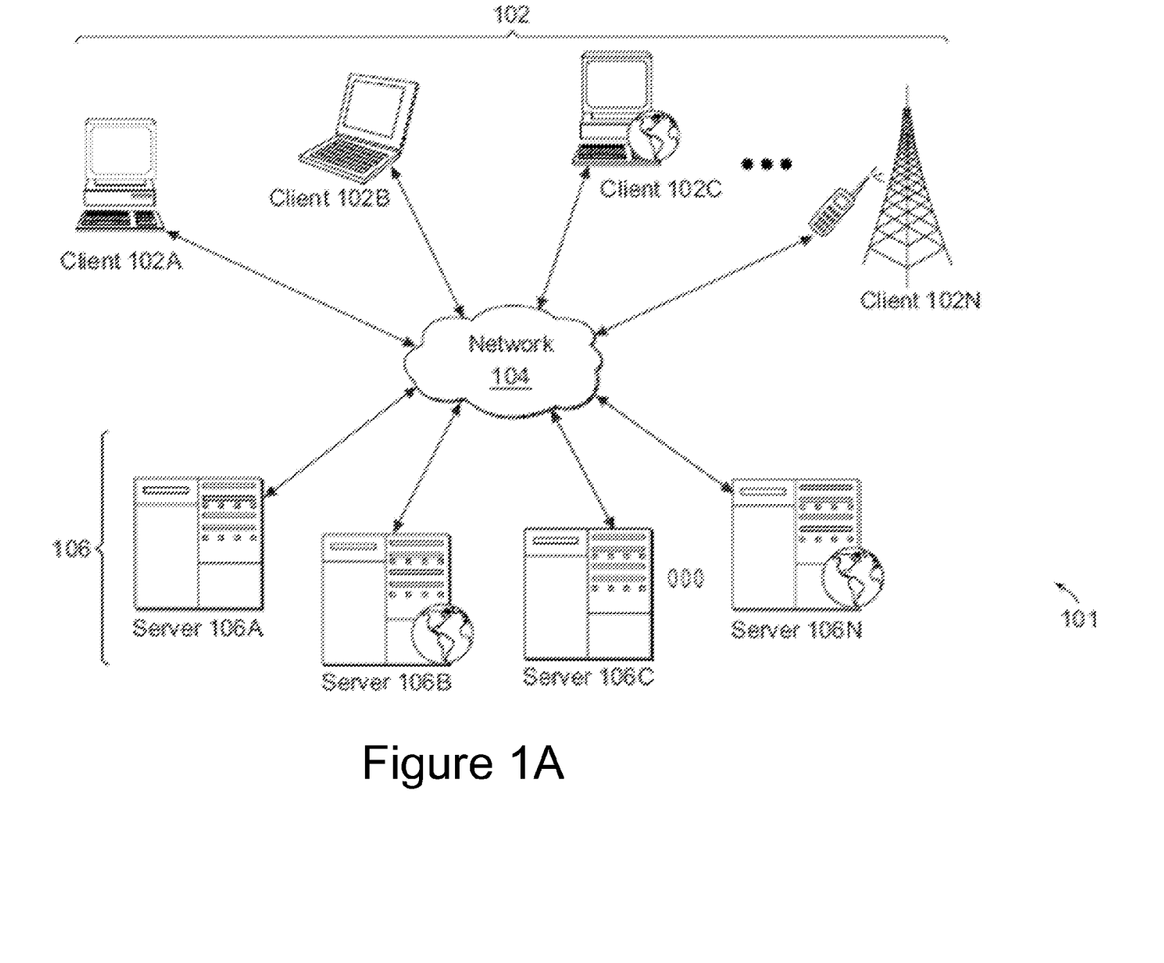
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
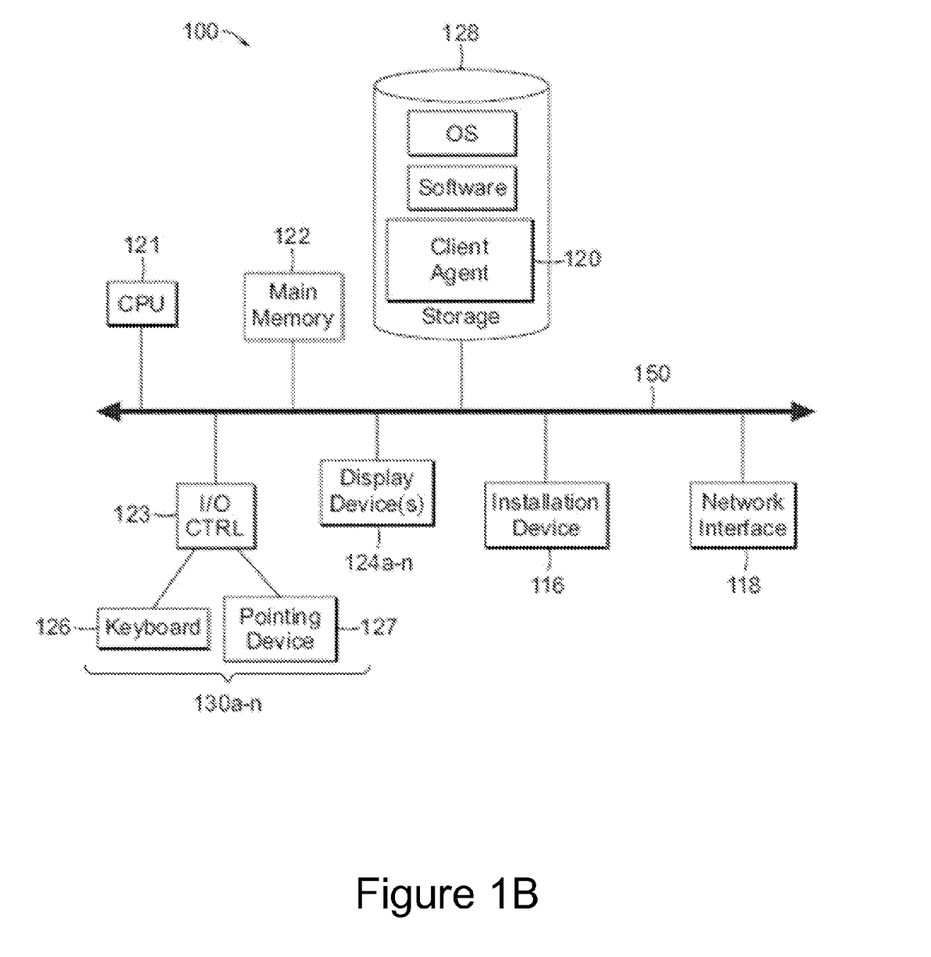
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
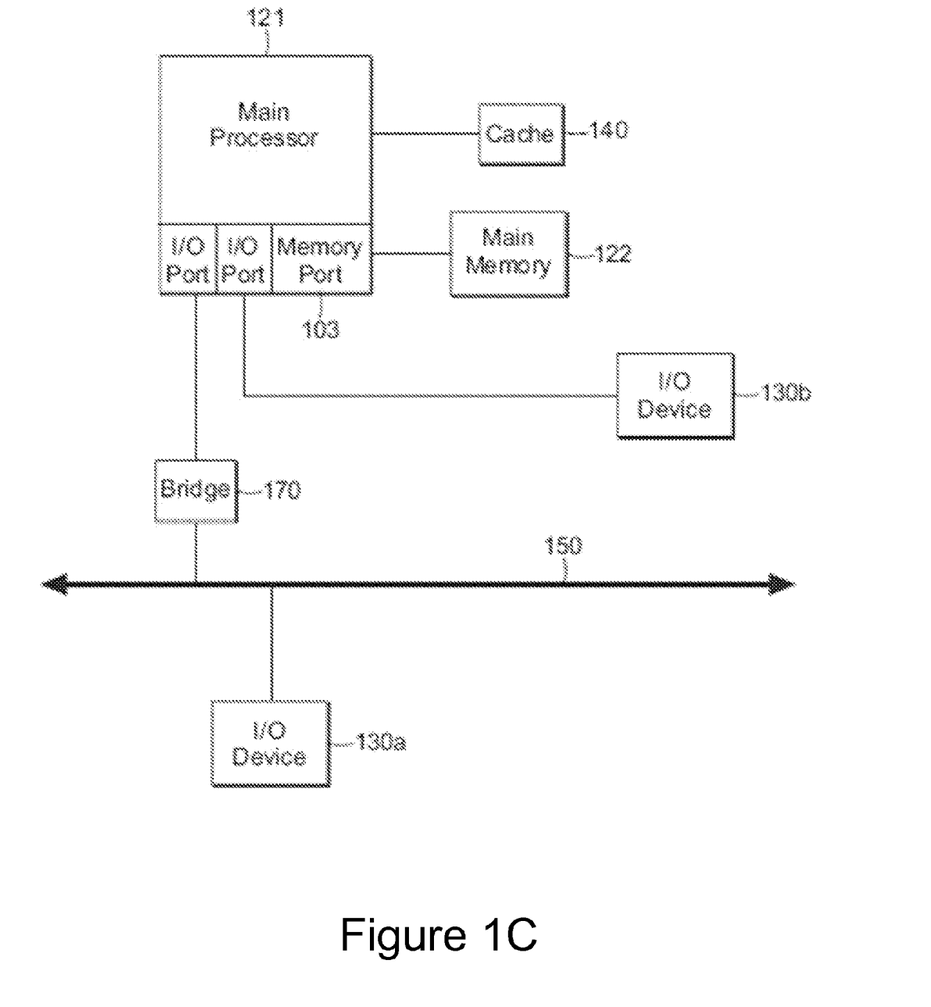

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2:
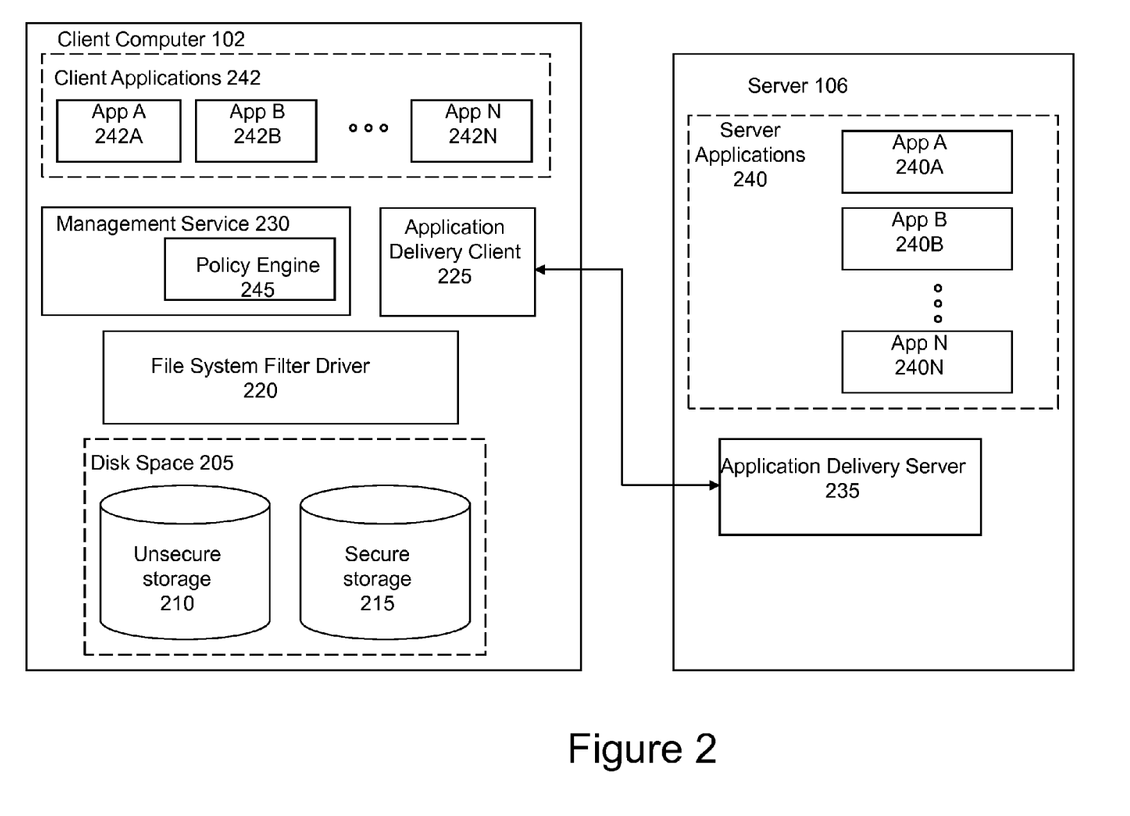
FIG. 2 is a block diagram illustrative of an embodiment of a system for saving secure application information in an encrypted disk space.

Illustrated in FIG. 2 is one embodiment of a system for forcing or requiring trusted corporate applications to save their data only in designated secure disk space. In some embodiments, the system can include a client computer 102 and a server 106 that communicate via a network 104. The client can include a disk space 205 that can further include an unsecure disk space 210 and a secure disk space 215. Executing on the client can be a file system filter driver 220, an application delivery client 225 and a management service 230. The server can execute one or more applications 240A-240N (generally referred to as server applications 242 or applications 240), and can also execute an application delivery server 235. The client can execute one or more applications 242A-242N (generally referred to as client applications 242 or applications 242), which may be locally installed applications, or applications installed in storage attached to client computer 102.

Further referring to FIG. 2, and in more detail, in one embodiment the system can include a client computer 102 and a server 106. The client computer 102 can be any computing device 100 described herein and can be any client 102 described herein. Similarly, the server 106 can be any computing device 100 described herein and can be any server 106 described herein. In some embodiments, the server 106 can be a server farm that includes one or more servers 106. The client 102 and the server 106 can communicate over a network 104 such as any network 104 described herein.

In some embodiments, client 102 may execute one or more applications 242A-242N (generally applications 242). In other embodiments, server 106 may execute one or more applications 240A-240N (generally, applications 240), which may be delivered to the client via application delivery client 225 and application delivery server 235. In some embodiments the application delivery client 225 executing on the client 102 can be an application, client or program that can receive application output, such as graphical display output or other data output, from a server application delivery client 235 executing on the server 106. The application delivery client 225 of the client 102 can receive application output and display the application output in an application window on the client 102. In some embodiments, the application delivery client 225 can facilitate the creation of a virtual channel between the client 102 and the server 106, and can facilitate communication between the application delivery system of the client 102 and the application delivery system of the server 106. The application delivery client 225 of the client computer 102 can communicate with the application delivery client 235 of the server 106 and can transmit and receive file access requests. In some embodiments, the application delivery client 225 can be an ICA client manufactured by CITRIX SYSTEMS. In other embodiments, application delivery client 225 may be referred to as a remote desktop client, a desktop presentation client, or any similar type of client, and may communicate with server 106 via a presentation layer protocol such as ICA or RDP.

The application delivery server 235 of the server 106 can execute on the server 106 and can interface with applications 240 executing on the server 106. In some embodiments, the server application delivery server 235 can intercept, retrieve or receive graphical application output, e.g. draw commands issued by an application 240, generated by an application 240 and can forward the application output together with any related image data to the application delivery client 225 of the client 102. The application delivery client 225 of the client computer 102 can use the application output and image data to redraw the application as it would be displayed on a display screen of the server 106. In some embodiments, the application delivery server 235 can be an ICA server manufactured by CITRIX SYSTEMS. In some embodiments, the application delivery client 225 of the client 102 can communicate with the application delivery server 235 over one or more virtual channels and one or more transport layer connections.

In still other embodiments, application delivery client 225 and application delivery server 235 may comprise applications for streaming an application 240 from server 106 for execution on client computer 102. In yet still other embodiments, application delivery client 225 and application delivery server 235 may comprise applications, services, agents, or other executable code for downloading an application to client computer 102 for online or offline execution. Accordingly, an application may be executed at server 106 with output transmitted to client 102; may be streamed for execution by client 102; may be downloaded or otherwise transferred to client 102 for local execution; or may be installed on client 102, without departing from the scope of this application.

The applications 240 and 242 (referred to generally as server applications 240 or client applications 242) can be any application. In some embodiments, the application 240 can include any application described herein, or any other application. In some embodiments, applications 240 executing on server 106 can interface with the application delivery server 235 by transmitting application output to the application delivery client 235. In other embodiments, as discussed above, applications 242 may execute on the client 102 and/or may be streamed to client 102 for execution by client 102.

In some embodiments, the client computer 102 can include disk space 205 that can include unsecure disk space or an unsecure storage location 210 and secure disk space or a secure storage location 215. Although illustrated within client computer 102, disk space 205 may include both physical disks included in the client computer 102, external physical disks available to the client computer 102, including dedicated disks and network disks, and virtual disks available to the client computer 102. Although referred to as disks, in some embodiments, disk space 205 may comprise flash storage, magnetic storage, optical storage, combinations of any of these, or any other type and form of storage device. Furthermore, although only one unsecure storage location 210 and one secure storage location 215 are illustrated, in many embodiments, multiple unsecure and secure storage locations may exist. For example, a user working for multiple corporations may utilize a secure storage location for each corporation, to keep confidential data of one organization isolated from data of the other. In one embodiment, unsecure disk space 210 may include disk space identified by the file system filter driver 220 or management service 230 as unsecure storage. In other embodiments, the unsecure disk space 210 can be marked as unsecure storage. Similarly, in some embodiments, disk space 205 may include secure disk space 215 which may be marked as secure storage, or identified by a file system filter driver 220 or management service 230 as secure storage.

In some embodiments, marking or otherwise identifying disk space 205 as unsecure 210 or secure 215 may include identifying volumes or drives in the disk space 205 as secure or unsecure by the file system filter driver 220, the application delivery client 225 or the management service 230. For example, in one embodiment, disk space 205 may be partitioned into one or more drives. For example, in a Windows operating system environment, disk space 205 may be partitioned into an unsecure A:\ drive, a second unsecure C:\ drive and a secure X:\ drive. Other drive letters may be used, and in other operating systems, other identifiers of the disk space may be utilized. In some instances, the file system filter driver 220, the application delivery client 225 or the management service 230 may identify in a table, index, database, or list whether each drive is secure or unsecure. For example, the A:\ and C:\ drives may be identified as unsecure, while the X:\ drive can be identified as secure. In other embodiments, a drive or partition may be identified as secure or unsecure via a property of the drive, an identifier, a predetermined bit in a drive identifier, a flag, or any other type and form of identification.

In one embodiment, an application delivery client 225 installed on the client 102, management service 230, or other client agent not illustrated may partition the disk space available on the client 102 to create a secure storage space 215 and an unsecure storage space 210. In other embodiments, upon booting, the application delivery client 225, management service 230 or other client agent not illustrated may partition the disk space available on the client 102 to create a secure storage space 215 and an unsecure storage space 210. In still other embodiments, the application delivery client 225, management service 230, or other client agent may create a secure disk space 215 by allocating a range of memory addresses as secure memory locations. Furthermore, although discussed as disk space, in some embodiments, the systems and methods discussed herein may be applied to managing secure and unsecure locations in memory, such as RAM.

In some embodiments, the file system filter driver 220 may interact with the application delivery client 225 or other application 240 executing on the client to intercept requests to read information from or write information to local storage on the client computer 102 and process the request according to the methods and systems described herein. The file system filter driver 220 can interact with the management service 230 and the application delivery client 225 or other application 240 to receive requests and obtain security information pertaining to which applications should be serviced with secure disk space 215 and which applications should be serviced with unsecure disk space 210. In one embodiment, the file system filter driver 220 can intercept the request, determine whether the data should be stored to a secure disk space 215 or unsecure disk space 210 and process the request by storing the information in either of the two storage areas. For example, the file system filter driver 220 can intercept a request issued by a trusted application executing on the server 106 and remotely presented by the application delivery client 225 or a trusted application executing on the client 102. Upon determining that the source application that generated the request is a trusted application that requires secure storage, the file system filter driver 220 can store the application data and other information in a secure disk space 215 on the client 102. In other embodiments, the file system filter driver 220 may intercept a request issued by a non-trusted application executing on the server or client to store application data. The file system filter driver 220 may allow the request to store data in an unsecure location, or may deny the request to store data in a secure location, responsive to the application being a non-trusted application. In some embodiments, the file system filter driver 220 can interact directly with streamed applications, corporate delivery applications, applications delivered by App-V, or other similar applications.

In some embodiments, a management service 230 may execute on the client 102 and can interface with the file system filter driver 220 and the application delivery client 225. In some embodiments, the management service 230 may comprise an application, server, service, daemon, routine, or other executable code, and may execute in user-mode or kernel-mode. In some embodiments, management service 230 may act as or comprise a policy engine. The management server 230 or a policy engine of the management service may manage the security policies and other management policies that determine which applications should be identified as trusted and which applications should be identified as not trusted. In some embodiments, the management service 230 may execute within the application delivery client 225 as a policy engine of the application delivery client and may be used to determine whether to redirect data generated by an application to a secure storage space 215. In other embodiments, the management service 230 or a policy engine of the management service 230 may be used to identify an application executing on the client as a trusted or non-trusted application. In one embodiment, the management service 230 can further manage which memory volumes, memory address ranges or drives are considered unsecure disk space 210 and which are considered secure disk space 215. In some embodiments, a corporate administrator can set policies to mark certain applications as trusted. Additional folders can also be specified as trusted and therefore needing to be enabled for automatic redirection.

In one embodiment, management service 230 or a policy engine may identify an application as a trusted application responsive to a user credential of the user executing the application. For example, in one embodiment, the user may be required to log in prior to executing the application as a trusted application. If the user does not log in, the application may be executed as a non-trusted application. In another embodiment, the application may be executed by a root or administrative user, and may be identified as a trusted application responsive to these user privileges. In yet another embodiment, the application may be provided by a server 106 and be identified as a trusted application by being provided by the server. For example, remotely executed applications or streamed applications, or applications downloaded from a corporate server, may be identified as trusted, while applications installed locally by the user or obtained elsewhere may be identified as non-trusted. In some embodiments, an application may be trusted or non-trusted depending on execution parameters of the session. For example, as discussed above, a user may be required to log in to execute the application as a trusted application. Depending on whether the user has logged in or not, the application may be executed either as a trusted application or a non-trusted application. This may be done to avoid requiring multiple instances of identical applications installed.

In a further embodiment, management service 230 or a policy engine may further comprise functionality for locking the secure storage location, responsive to the client not having contacted the server or another computing device, such as an authentication server, within a predetermined time period. In some embodiments, server 106 or another server may operate a centralized management service, ticket authority, licensing server, or other service, and the management service or policy engine may lock the secure storage location responsive to the client not having contacted the centralized management service within a predetermined time period. This may be done to provide a dead-man switch to control corporate data on mobile devices, particularly in instances where the user owns the mobile device. For example, a user with a laptop may transfer corporate data to the laptop and work on it in the secure storage location, either staying connected to a corporate network or working offline and intermittently connecting to synchronize files or retrieve email. If the user leaves the company, typically a corporate employee would be required to obtain access to the user's laptop to remove or verify removal of corporate files. This may be difficult with remote users, or due to circumstances of the user's departure. Accordingly, if the user does not log in to the corporate network within a predetermined time period (for example, if their account is disabled on termination), management service 230 or the policy engine may disable the secure storage location, deny read/write access to the data stored within the location, or erase or overwrite the secure storage location.

Figure 3A:
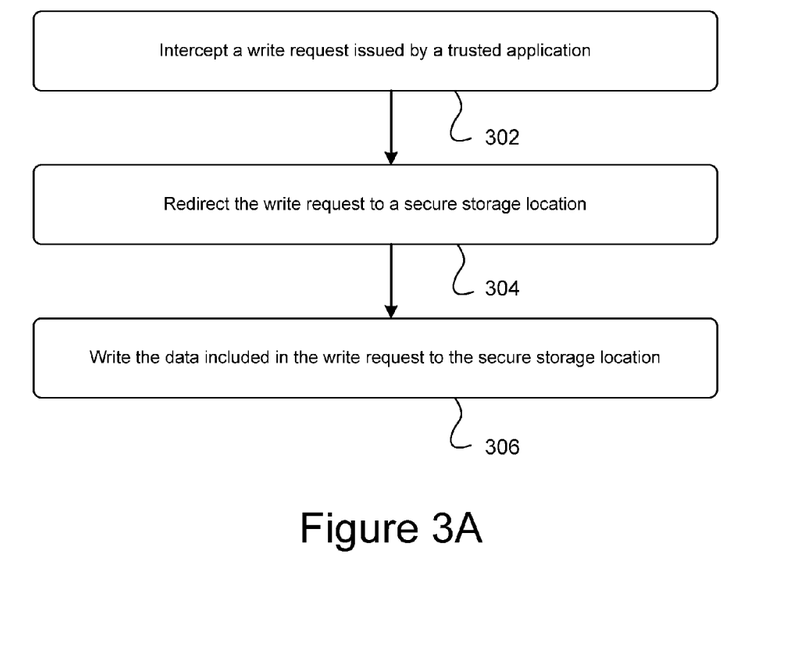
FIG. 3A is a flow diagram illustrative of an embodiment of a method for saving secure application information in an encrypted disk space.

Illustrated in FIG. 3A is one embodiment of a method for redirecting requests issued by a trusted or secure application to a secure storage space 215. A storage filter intercepts a write request issued by a trusted application (Step 302) and redirects the write request to a secure storage location (Step 304). The write request can then be serviced by the secure storage location in that the data included in the request is written to the secure storage location (Step 305).

Further referring to FIG. 3A, and in more detail, in some embodiments the filter driver can first identify whether an application is a trusted or secure application that requires a secure storage area. This determination, in some aspects, can include denying a trusted application access to an unsecure storage area when the trusted application issues a write request to an unsecure storage area (e.g. C:\ drive). In these embodiments, a user cannot save to an unsecure storage location. Rather, a filter driver executing on the client 102 can intercept the write request issued by the trusted application, and can redirect the request to a secure storage location (e.g. X:\ drive.) The data of the request can then be written to the secure storage location. In some embodiments, the data can be encrypted when it is stored. In other embodiments, user s can open existing documents from an unsecure storage area, but the secure/trusted application would only see the content as read only and therefore could not write back to the unsecure storage location. For example, a trusted version of Microsoft Word could store application files in the secure storage area and therefore only write to the secure storage area. If a user were to open a Microsoft Word file stored in an unsecure area, and attempt to open the file using the secure instance of Microsoft Word, the version of the document opened would be read only.

While FIG. 3A illustrates a method where all write requests issued by a trusted or secure application are redirected to a secure storage location, in other embodiments only a portion of the issued write requests are redirected. In some embodiments, write requests issued by a trusted or secure application are not redirected and instead an error message can be returned to the application. In these embodiments, the user can receive an "Access Denied" message in response to trying to save to a location or execute the application. In one embodiment, the methods described in FIG. 3 can be used to restrict an application so that the application stores it data in a designated secure storage area. Applications can include applications delivered through a remote application system, streamed applications, locally available applications, or applications delivered using Microsoft App-V technology.

Figure 3B:
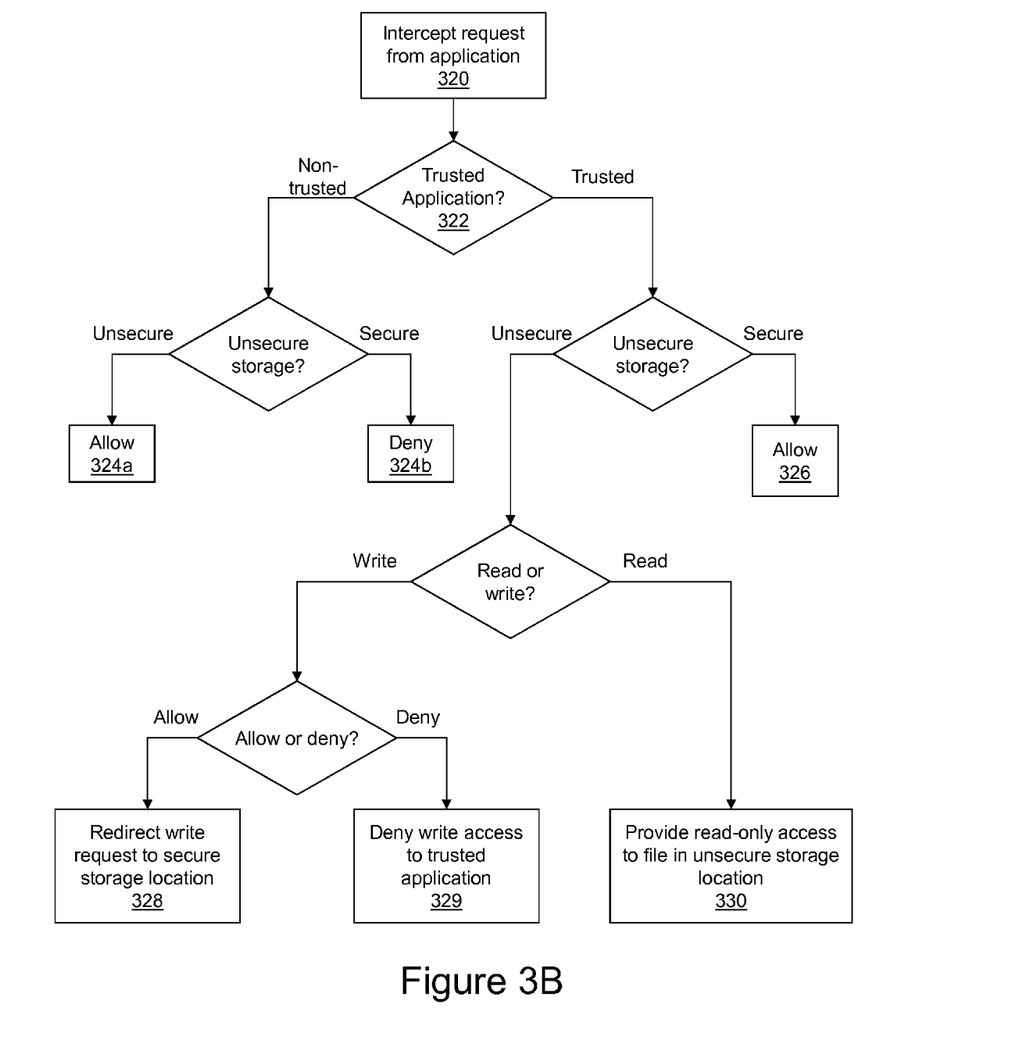
FIG. 3B is another flow diagram illustrative of an embodiment of a method for saving secure application information in an encrypted disk space.

Referring now to FIG. 3B, illustrated is another flow chart of an embodiment of a method for controlling access to sensitive information. At step 320, a file system filter driver may intercept a request from an application. The request may comprise a request to write a set of data to a first storage location or read a set of data from the first storage location. The application may comprise a locally-executed application or application executed by the computing device, including a streamed application delivered from a second computing device, or may comprise a client agent or remote display application displaying output data, such as graphical output data, of a second application executed by a second computing device. For example, the application may be an ICA client displaying graphical output data of a second application executed by a server, such as a remote desktop.

At step 322, a policy engine may identify if the application is a trusted application. Although shown after step 320, in many embodiments, the policy engine may first identify if the application is a trusted application prior to the file system filter driver intercepting the request. For example, in some embodiments, when an application is launched, initiated or otherwise executed at the client, the policy engine may identify if the application is a trusted application or non-trusted application. The policy engine may note that the application is trusted or non-trusted in an index, database, registry, or other list, such that the file system filter driver may consult the list when intercepting later requests from the application. In some embodiments, the policy engine may identify the application as a trusted application responsive to user credentials of the user on whose behalf the application executes. For example, if the application is executed by a root user or administrator, the policy engine may identify the application as a trusted application. If the application is executed by a guest user, the policy engine may identify the application as a non-trusted application. In similar embodiments, the user may be required to provide credentials, such as a username and password, security authorization, certificate, biometric information, or other credentials, and the policy engine may identify the application as a trusted or non-trusted application responsive to the credentials. In other embodiments, the policy engine may identify the application as a trusted application responsive to credentials of the computing device. For example, the policy engine may identify the application as a trusted application responsive to the computing device having a firewall, an anti-virus application, a current security update, an established connection to an authorization server, or any other type and form of credentials or traits.

In still other embodiments, the policy engine may identify the application as a trusted application responsive to an administrator-established policy. For example, an application may be identified as a trusted application responsive to a registry key, an index listing, being located in a specific directory, having been provided by a second computing device, or any other characteristics. In one embodiment, an application may be identified as a trusted application responsive to a second application executing, establishing a connection to a server, or performing other tasks. For example, a user may be required to execute an authentication application that may require a username and password or connection to an authentication server. While the authentication application is executing and the user is successfully logged in, in one embodiment, one or more additional applications executed by the user may then be executed in a trusted mode.

In some embodiments, the application may be a non-trusted application during a first session and a trusted application during a second session. For example, the user may be provided with an option to log in to execute the application in a trusted mode. If the user does not log in, or logs in incorrectly, the application may be executed in a non-trusted mode. In another embodiment, such as the above discussed embodiments in which the user logs in via a second authentication application, the policy engine may switch an application from trusted to non-trusted during execution, for example, responsive to the user logging out or closing the second authentication application.

If an application is non-trusted, then the file system filter driver may allow any read or write requests to an unsecure storage location at step 324a, and deny any read or write requests to a secure storage location at step 324b. In a further embodiment, denying read and write requests to the secure storage location may comprise redirecting such requests to the unsecure storage location. For example, if a non-trusted application attempts to write to a directory in the secure storage location, the file system filter driver may intercept and redirect the request to a directory in the unsecure storage location. This may be done to allow a seamless user experience, such that the user always believes they're working in the same directory, but different files are accessible responsive to the user executed an application in a trusted or non-trusted mode. In other embodiments, attempts to read or write to the secure storage location by a non-trusted application may be denied, and an alert message may be provided to the user. The user may be provided with an opportunity to log in or otherwise provide authentication credentials, such that the policy engine may identify the application as a trusted application. In a further embodiment, upon providing such credentials, the file system filter driver may then allow the read or write request, responsive to the application being identified as a trusted application.

If an application is trusted, then at step 326, the file system filter driver may allow any read or write requests to the secure storage location. In some embodiments, reading from and writing to the secure storage location may comprise decrypting and encrypting data stored in the secure storage location. In a further embodiment, as discussed above, in some embodiments, the management service or policy engine may determine, responsive to the request to read or write data to the secure storage location, whether the computing device has communicated with a second computing device within a predetermined time. This time may be as short as a minute or second or shorter, or may be as long as a day or a week, or longer, and may be set by an administrator of the system or an owner of the data stored in the secure storage location. Communicating with the second computing device may comprise establishing an authenticated session, retrieving a security certificate or credential, logging in, or performing other security related tasks. If the computing device has not communicated with the second computing device within the predetermined time period, the file system filter driver may deny read and/or write access to the secure storage location. In a further embodiment, the computing device may erase the secure storage location, remove a disk partition corresponding to the secure storage location, or take other actions to protect data stored in the secure storage location.

If the application is trusted and the request is to write a block of data to an unsecure storage location, then in some embodiments, the file system filter driver may determine whether to allow or deny the request. Allowing or denying the request may be performed responsive to a policy determined by an administrator, and may be responsive to the application, the user, the storage location, or any other type and form of information. For example, in one such embodiment, the file system filter driver may redirect trusted application write attempts to a first unsecure storage location, such as a "My Documents" folder, but deny application write attempts to a second unsecure storage location, such as a Desktop folder, root directory, registry file, configuration file, system folder, or any other location. In another such embodiment, the file system filter driver may redirect trusted application write attempts performed on behalf of an administrator, but deny those performed on behalf of a guest user. In still another embodiment, the file system filter driver may redirect write requests from a trusted word processing document, but deny requests from a trusted web browsing application. In yet still another embodiment, and as discussed above, the file system filter driver may deny write requests from a trusted application if the first computing device has not contacted a centralized management service within a predetermined period of time.

If the file system filter driver determines to allow the request, then at step 328, the file system filter driver may redirect the request to the secure storage location. In some embodiments, redirecting the request may comprise creating one or more directories in the secure storage location corresponding to directors in the unsecure storage location. For example, in one embodiment in which a trusted application attempts to write to an unsecure storage location at C:\Users\Default\AppData\Application\, the file system filter driver may create directories in a secure storage location such that the application write may be redirected to, for instance, X:\Users\Default\AppData\Application\. In other embodiments, different levels of directories may be used. For example, in one such embodiment, the file system filter driver may redirect a write request to C:\Users\Default\AppData\Application\ to X:\AppData\Application\. In one embodiment, redirecting the request may further comprise encrypting the data after writing the data to the secure storage location. Accordingly, through the above method, application data of a trusted application may be automatically redirected to a secure, encrypted storage location.

In other embodiments, the file system filter driver may determine to deny the request. If the file system filter driver determines to deny the request, then at step 329, the file system filter driver may deny write access to the unsecure storage location. Denying write access to the unsecure storage location may comprise returning an error to the requesting application indicating that access is denied. In some embodiments, the computing device may present an error message or other alert to the user indicating that access is denied.

If the application is trusted and the request is to read a block of data from an unsecure storage location, then at step 330, in some embodiments, the file system filter driver may provide read-only access to the file in the unsecure storage location. Providing read-only access may comprise setting a flag or other property of the file on open, or otherwise preventing the application from being able to modify the file. In some embodiments, the user of the trusted application may save a copy of the file in another location. For example, the user may save a copy of the read-only file as an editable file in the secure storage location, to which full write access has been allowed.

Although FIG. 3B shows a specific order of queries, one of skill in the art may readily appreciate that these queries may occur in different orders in some embodiments. For example, in one such embodiment, the file system filter driver may first determine whether an intercepted write request is to write to an unsecure or a secure storage location prior to identifying whether the requesting application is trusted or non-trusted. In another embodiment, control over read or write requests to the secure storage space may be provided through permissions or access control lists. Accordingly, in some embodiments, the file system filter driver may not intercept requests directed to the secure storage location, allowing other operating system mechanisms to control access. The file system filter driver may instead intercept requests to read or write to the unsecure storage location, and may process them according to whether the request comes from a trusted or non-trusted application.

In some embodiments of the methods and systems discussed herein, trusted application data including cached data or program data may be redirected to the secure storage location, protecting corporate information. For example, in one such embodiment, a user may execute an email program such as Outlook, manufactured by Microsoft, Inc. The email program may connect to a corporate mail server and download one or more messages for offline access. For example, in many embodiments, Outlook creates an offline storage table (.ost file) that may be used for reading emails, writing replies, or performing other tasks. The offline data is then synchronized with the mail server during a next access. Because the offline data includes email messages and attachments, it may be desirable to protect this information. Typically, Outlook creates the offline storage table in an unsecure default location. Without modifying the email program, and, in fact, transparently to the application, the file system filter driver discussed above may intercept read and write requests to this table and redirect the requests to a secure, encrypted disk storage location, protecting the data from access by other non-trusted programs.

Similarly, the file system filter driver may be used to intercept read requests of trusted applications to user files stored in unsecure storage locations, and open the files in a read-only mode. Because the application is trusted and has access to the secure storage location, a malicious macro in a file stored in the unsecure location could include commands to access a secure file, retrieve data from the secure file, and save the retrieved data in the unsecure file, defeating the security protections. Accordingly, by opening the file in a read-only mode, the trusted application is prevented from writing any data to an unsecure storage location.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for forcing an application to store data in a secure storage location, the method comprising:
    identifying, by a policy engine executed by a first computing device, a first application executed by the first computing device as a trusted application based on user credentials of a user;
    intercepting, by a file system filter driver, a first request of the first application to write a first set of data to an unsecure storage location;
    redirecting, by the file system filter driver, responsive to the identification of the first application as the trusted application, the intercepted first request to a secure storage location; and
    writing, by the first computing device, the first set of data to the secure storage location;
    identifying, by the policy engine, a second application executed by the first computing device as a non-trusted application;
    intercepting, by the file system filter driver, a first request of the second application to write a second set of data to the unsecure storage location; and
    directing, by the file system filter driver, responsive to the identification of the second application as the non-trusted application, the first computing device to write the second set of data to the unsecure storage location;
    intercepting, by the file system filter driver, a second request of the first application to write a third set of data to the unsecure storage location;
    determining, by the policy engine, responsive to the identification of the first application as the trusted application, that a first application delivery client executed by the first computing device has not communicated with a centralized management service executed by a second computing device within a predetermined time period; and
    denying, by the file system filter driver, responsive to the determination, the second request to write the third set of data to the unsecure storage location.

2. The method of claim 1, further comprising
    intercepting, by the file system filter driver, a request of the first application to read a file from the unsecure storage location; and
    providing, by the file system filter driver, responsive to the identification of the first application as the trusted application, read-only access to the file to the first application.

3. The method of claim 1, wherein writing the first set of data to the secure storage location further comprises encrypting the first set of data in the secure storage location.

4. The method of claim 1, wherein the first computing device is a mobile computing device.

5. The method of claim 1, wherein the first application is a client agent displaying graphical output data executed by a computing device, communicated to the first computing device via a remote desktop protocol.

6. The method of claim 1, wherein identifying the first application as the trusted application comprises applying a policy to user credentials of the user of the first application.

7. The method of claim 1, wherein identifying the first application as the trusted application comprises receiving, from a computing device, a list of predetermined applications identified as trusted by an administrator.

8. The method of claim 1, wherein the first application is streamed from a computing device, and identifying the first application as the trusted application comprises determining that the first application is a streamed application.

9. The method of claim 1, further comprising:
    intercepting, by the file system filter driver, a second request of the second application to read the first set of data from the secure storage location; and
    denying, by the file system filter driver, responsive to the identification of the second application as a non-trusted application, the second request to read the first set of data from the secure storage location.

10. A system for forcing an application to store data in a secure storage location, the system comprising:
    a first hardware computing device comprising an unsecure storage location, a secure storage location, and a processor configured to execute:
    a first application,
    a software policy engine, identifying the first application as a trusted application based on user credentials of a user, and
    a file system software filter driver configured to:
    intercept a first request of the first application to write a first set of data to the unsecure storage location,
    redirect, responsive to the identification of the first application as the trusted application, the intercepted first request to a secure storage location, and
    write the first set of data to the secure storage location;
    the processor of the first hardware computing device is further configured to:
    execute a second application; and
    execute the software policy engine to identify the second application as a non-trusted application; and
    the file system software filter driver is further configured to:
    intercept a first request of the second application to write a second set of data to the unsecure storage location; and
    direct, responsive to the identification of the second application as the non-trusted application, the first hardware computing device to write the second set of data to the unsecure storage location;
    wherein:
    the processor of the first hardware computing device is further configured to execute a first application delivery client;
    the software policy engine is further configured to determine, responsive to the identification of the first application as the trusted application, that the first application delivery client executed by the first hardware computing device has not communicated with a centralized management service executed by a second hardware computing device within a predetermined time period; and
    the file system software filter driver is further configured to:
    intercept a second request of the first application to write a third set of data to the unsecure storage location, and
    deny, responsive to the determination, the second request to write the third set of data to the unsecure storage location.

11. The system of claim 10, wherein the file system software filter driver is configured to:
    intercept a request of the first application to read a file from the unsecure storage location; and
    provide, responsive to the identification of the first application as the trusted application, read-only access to the file to the first application.

12. The system of claim 10, further comprising the file system software filter driver configured to encrypt the first set of data in the secure storage location.

13. The system of claim 10, wherein the first hardware computing device is a mobile computing device.

14. The system of claim 10, wherein the first application is a software client agent configured to display graphical output data of an application executed by a hardware computing device, communicated to the first hardware computing device via a remote desktop protocol.

15. The system of claim 10, wherein the software policy engine is configured to apply a policy to user credentials of the user of the first application to identify the first application as the trusted application.

16. The system of claim 10, wherein the software policy engine is configured to receive from a hardware computing device, a list of predetermined applications identified as trusted by an administrator to identify the first application as the trusted application.

17. The system of claim 10, wherein the first application is streamed from a hardware computing device, and the software policy engine is configured to determine that the first application is a streamed application.

18. The system of claim 10, wherein:
   the processor of the first hardware computing device is further configured to execute the second application; and
   the file system software filter driver is further configured to:
   intercept a second request of the second application to read the first set of data from the secure storage location; and
   deny, responsive to the identification of the second application as a non-trusted application, the second request to read the first set of data from the secure storage location.

* * * * *